US009231282B2

(12) United States Patent
Yebka et al.

(10) Patent No.: US 9,231,282 B2
(45) Date of Patent: Jan. 5, 2016

(54) METHOD OF RECEIVING A POTENTIAL VALUE OF A NEGATIVE ELECTRODE TO CHARGE A LITHIUM-ION CELL

(75) Inventors: Bouziane Yebka, Apex, NC (US); Joseph Anthony Holung, Wake Forest, NC (US); Kenneth Scott Seethaler, Wake Forest, NC (US); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 547 days.

(21) Appl. No.: 13/543,537

(22) Filed: Jul. 6, 2012

(65) Prior Publication Data

US 2014/0008976 A1 Jan. 9, 2014

(51) Int. Cl.
*H02J 7/00* (2006.01)
*H01M 10/44* (2006.01)
*H01M 10/0525* (2010.01)

(52) U.S. Cl.
CPC .......... *H01M 10/44* (2013.01); *H01M 10/0525* (2013.01); *H02J 7/00* (2013.01); *Y02E 60/122* (2013.01); *Y02T 10/7011* (2013.01); *Y10T 307/344* (2015.04)

(58) Field of Classification Search
CPC .............. H01M 10/0525; H01M 10/4235; H01M 10/48; H01M 10/0587; H01M 10/42; H01M 10/425; H01M 10/44; H01M 10/486; H01M 6/5044; H01M 6/50; Y02T 10/7011
USPC .............. 320/118, 130, 112; 429/50, 61
See application file for complete search history.

(56) References Cited

U.S. PATENT DOCUMENTS

| 6,476,585 | B1* | 11/2002 | Simmonds | 320/162 |
| 8,125,190 | B2 | 2/2012 | Odaohhara | |
| 8,598,947 | B2* | 12/2013 | Kim | 327/540 |
| 2009/0009143 | A1 | 1/2009 | Odaohhara | |
| 2009/0104510 | A1* | 4/2009 | Fulop et al. | 429/50 |

FOREIGN PATENT DOCUMENTS

| JP | 08-190934 A | 7/1996 |
| JP | 2001052760 A | 2/2001 |
| JP | 2006252849 A | 9/2006 |
| JP | 2010238423 A | 10/2010 |
| JP | 2012100383 A | 5/2012 |
| WO | 2011161865 A1 | 12/2011 |

OTHER PUBLICATIONS

Microchip Technology Inc., "Advanced Single or Dual Cell Lithium-Ion/Lithium-Polymer Charge Management Controllers", DS21823C, 2004 (24 pages).

Zhou, J., "Lithium Metal Microreference Electrodes and their Applications to Li-ion Batteries", Eindhoven University of Technology, 2007 (148 pages).

(Continued)

*Primary Examiner* — Yalkew Fantu
(74) *Attorney, Agent, or Firm* — Brian J. Pangrle

(57) ABSTRACT

A method can include receiving a potential value of a negative electrode of a lithium-ion cell and, for a cell charging process for the lithium-ion cell, adjusting a constant voltage phase voltage based at least in part on the potential value of the negative electrode. Various other apparatuses, systems, methods, etc., are also disclosed.

19 Claims, 13 Drawing Sheets

(56) References Cited

OTHER PUBLICATIONS

Microchip Technology Inc., "Charging Simplified for High Capacity Batteries", ADN008, 2004 (2 pages).
Atmel Corporation, "AVR453: Smart Battery Reference Design", Rev. 2599C-AVR-02/06, 2006 (37 pages).
"SMBus Control Method Interface Specification", Version 1.0, Dec. 10, 1999 (41 pages).
Renesas, "MCUs H8S Family H8SX Family", 2008 (15 pages).
"Smart Battery Data Specification", Revision 1.1, Dec. 11, 1998 (54 pages).

* cited by examiner

US 9,231,282 B2

METHOD OF RECEIVING A POTENTIAL VALUE OF A NEGATIVE ELECTRODE TO CHARGE A LITHIUM-ION CELL

TECHNICAL FIELD

Subject matter disclosed herein generally relates to technology for one or more electrochemical cells.

BACKGROUND

Electrochemical cells include, for example, lithium-ion cells. Such cells can be repeatedly charged and discharged. Capacity of a lithium-ion cell may diminish over time. Various technologies and techniques described herein pertain to electrochemical cells, for example, including lithium-ion charge control.

SUMMARY

A method can include receiving a potential value of a negative electrode of a lithium-ion cell and, for a cell charging process for the lithium-ion cell, adjusting a constant voltage phase voltage based at least in part on the potential value of the negative electrode. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1A:
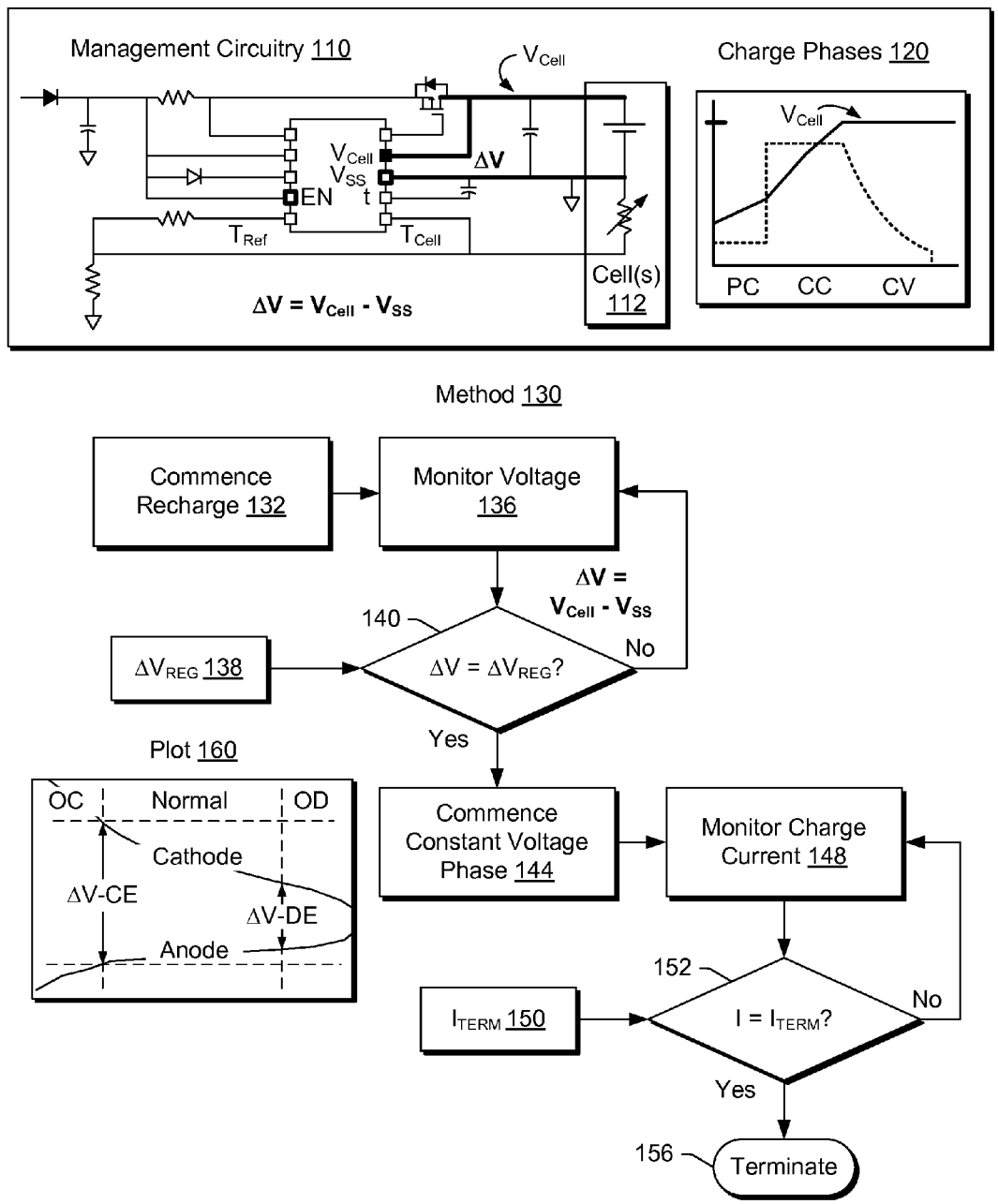
FIG. 1A is a diagram of management circuitry, charge phases for charging a lithium-ion cell or cells, a plot of potentials, and a method
Figure 1B:
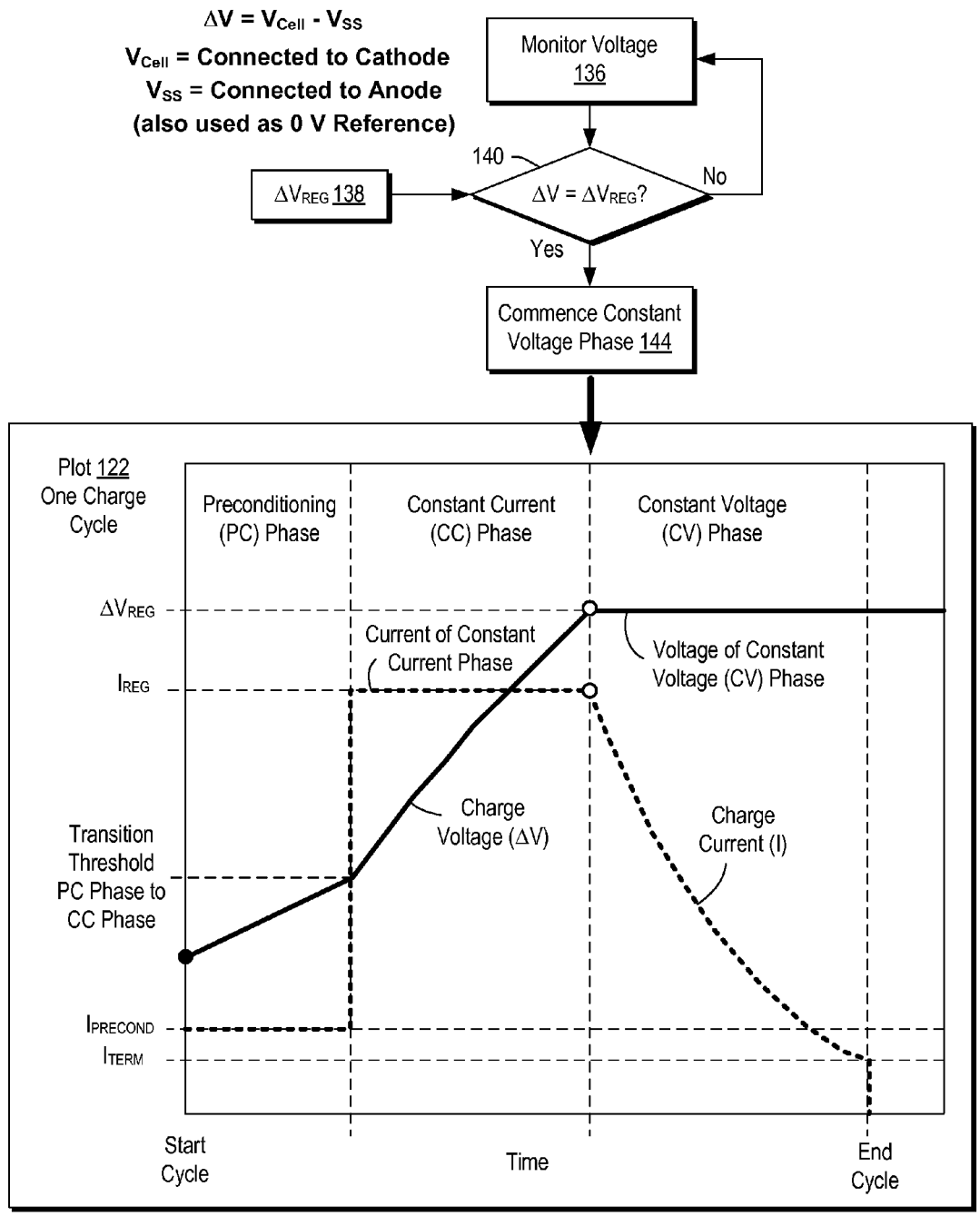
FIG. 1B is a portion of the method and a more detailed plot of potentials.

FIG. 1 shows an example of management circuitry 110 for managing charging of one or more electrochemical cells 112, an example charge phase plot 120, an example of a method 130 and an example potential plot 160 (FIG. 1A) and shows a more detailed charge phase plot 122 (FIG. 1B).

As shown in FIG. 1, management circuitry 110 includes an integrated circuit with 10 pins. The pins may include charge current sense input, battery management input supply, charge status output, logic enable, cell temperature sensor bias, cell temperature sensor input, timer set, cell management 0 V reference, cell voltage sense, and drive output. As to protection features, a cell temperature sensor bias feature may provide for a voltage reference to bias an external thermistor for continuous cell temperature monitoring and prequalification while a cell temperature sensor input feature may provide for input for an external thermistor for continuous cell temperature monitoring and prequalification (optionally may be disabled by applying a set voltage) and safety timers (e.g., preconditioning, fast charge, elapsed time termination, etc.) that may be scaled by a capacitor. A temperature-sensing circuit may have its own reference such that it is immune to fluctuations in the supply voltage input (e.g., where the temperature-sensing circuit is removed from the system when no supply is applied, eliminating additional discharge of cell(s)).

As to logic, a logic enable feature may provide for input that, for example, forces charge termination, initiates charge, clears faults or disables automatic recharge. For example, a logic-enable input pin (EN) may provide for features to terminate a charge anytime during the charge cycle, initiate a charge cycle or initiate a recharge cycle. A logic input (e.g., high or low) may signal termination of a charge cycle.

Also shown in FIG. 1 is an example of a charge phase plot 120 that indicates, as an example, how charging may include a preconditioning phase (PC), a constant current phase (CC) and a constant voltage (CV) phase.

A cell voltage sense function (e.g., implemented in part via the pin labeled "$V_{Cell}$") can provide for monitoring voltage at, for example, a positive terminal of a cell (e.g., for single, dual, etc., series cell packs with coke or graphite anodes) with respect to a reference that is based on the negative terminal of a cell (see, e.g., the pin labeled $V_{SS}$). Thus, the management circuitry 110 can measure voltage (e.g., $\Delta V$) as a difference between a cathode potential ($V_{cathode}$, as applied at the pin $V_{Cell}$) and an anode potential ($V_{anode}$, as applied at the pin $V_{SS}$). As explained with respect to the method 130, a specified voltage ($\Delta V_{REG}$) may be a limit for $\Delta V$. In the example of FIG. 1, the management circuitry 110 and the method 130 do not include a mechanism for adjusting $\Delta V_{REG}$ or adjusting measurements of $V_{cell}$ or $\Delta V$ if the anode potential ($V_{anode}$) as applied to the pin $V_{SS}$ should change. For example, if the anode potential ($V_{anode}$) applied to the pin $V_{SS}$ increases then the cathode potential ($V_{cathode}$) applied to the pin $V_{Cell}$ required to commence the constant voltage (CV) phase may be increased as well, possibly to a potential that exceeds an upper limit for the cathode.

As an example, the management circuitry 110 may operate stand-alone or in conjunction with one or more other circuits (e.g., a host controller, etc.). Management circuitry may apply constant current followed by constant voltage to charge one or more cells. As an example, charger circuitry may include a MPC7384X family chip (Microchip Technology, Inc., Chandler, Ariz.), which is described in a document entitled "Advanced Single or Dual Cell Lithium-Ion/Lithium-Polymer Charge Management Controllers" (Microchip Technology, Inc., 2004), which is incorporated by reference herein. As described herein, the term "lithium-ion" includes, for example, "lithium-polymer" as well as "lithium-ion polymer". Management circuitry may be provided with a battery, a package, a device, as part of dedicated power circuitry (e.g., a battery charger), etc.

Management circuitry may be configured to manage, to varying extent, state-of-charge (SOC) mismatch and capacity/energy (C/E); noting that as the number of cells and load currents increase, the potential for mismatch also increases. Though SOC may be more common, each type of mismatch problem may limit capacity (mA·h) of a pack of cells to capacity of the weakest cell.

In the example of FIG. 1, the cell(s) 112 may include a polymer composite material such as polyethylene oxide or polyacrylonitrile that includes lithium salt. Such a cell or cells may be referred to as a lithium-ion battery or a lithium-ion polymer battery or a lithium-polymer battery (e.g., "LiPo battery" or "LiPo cell"). LiPo cells are sometimes referred to as laminate cells, which may be configured very thin or quite large depending on their intended use. One or more LiPo cells may be encased in a flexible aluminum foil laminate pouch (e.g., with a thickness on the order of about 0.1 mm). LiPo cells may include a stacked construction formed by stacking electrode and electrolyte materials in a flat sandwich (e.g., defined by length, width and height dimensions). Stacked layers may be packed in a package (e.g., the pouch package 130) in a flat, rolled or other configuration. LiPo cell capacities can include capacities in a range, for example of about 50 mA·hrs (e.g., for a small cell such as for a BLUETOOTH™ headset) to about 10 A·hrs or more for an electric vehicle (e.g., electric or hybrid).

As to function of a lithium-ion cell, lithium ions move from a negative electrode to a positive electrode during discharge and reversely when being charged. As an example, a LiPo cell can include a polyethylene (PE), a polypropylene (PP), a PP/PE, or other material as a separator. Some LiPo cells include a polymer gel containing an electrolyte solution, which is coated onto an electrode surface. For LiPo cells, close packing can allow for a high density.

For lithium-ion cells, when cell voltage drops to a low value (e.g., about 1.5 V), reactions at an anode can produce gas (e.g., over-discharge or "OD"). If voltage continues to drop (e.g., under about 1 V), copper of a copper-based anode current collector can start to dissolve and may short out a cell. When cell voltage increases to a high value (e.g., about 4.6 V), gassing may occur at a cathode as electrolyte may start to decompose (e.g., overcharge or "OC"). As an example, a lithium-ion cell or cells may be connected to an external thermal fuse for overcharge protection (e.g., in addition to the control by management circuitry). As to the potential plot 160, it shows a normal operating range that exists between a charge end voltage ($\Delta$V-CE) and a discharge end voltage ($\Delta$V-DE). In the example of FIG. 1, the normal range lies between an overcharge region (OC) and an over-discharge region (OD). As mentioned, damage can occur in either of these regions.

As to the example method 130 of FIG. 1, it pertains to recharging one or more lithium-ion cells such as the cell(s) 112, for example, using circuitry such as the management circuitry 110 and achieving charge phases such as those of the charge phase plot 120.

As shown in FIG. 1, the method 130 commences in a commencement block 132 for commencing a recharge of one or more cells. The commencement block 132 can initiate a preconditioning (PC) phase and, thereafter, a constant current (CC) phase. A monitor block 136 follows for monitoring voltage of the one or more cells during a constant current (CC) phase. A decision block 140 relies on monitoring of the voltage for comparison to a specified voltage ($\Delta V_{REG}$). The decision block 140 provides for deciding when the recharge process should terminate the constant current (CC) phase and commence a constant voltage (CV) phase.

The decision block 140 may receive a value for the specified voltage ($\Delta V_{REG}$) from one or more storage registers 138 for storing one or more values for the specified voltage ($\Delta V_{REG}$). In the example of FIG. 1, the one or more storage registers 138 may store a value such as 4.1 V, 4.2 V, 8.2 V, 8.4 V, etc. (e.g., as one or more preset voltage regulation options). The value or values stored in the one or more storage registers 138 may depend on characteristics of a cell or cells or number of cells (e.g., where n=2, n*4.1 V provides a value of 8.2 V). In the example of FIG. 1, the specified value ($\Delta V_{REG}$) may be based on the maximum voltage that a particular lithium-ion cell (or cells) can reach during charging as to prevent overcharge side reactions at a positive electrode and material phase changes in a positive electrode. As some examples, consider a $LiCoO_2$ cathode material with a maximum operational potential of about 4.2 V and a $LiMnO_4$ cathode material with a maximum operational potential of about 4.3 V.

In the example of FIG. 1, the management circuitry 110 can reference all inputs and outputs with respect to a management circuit reference potential ($V_{SS}$) that is intended to be a 0 V reference potential. In the circuitry 110, one of the pins, labeled $V_{SS}$, is electrically connected to the "negative" electrode of the cell(s) 112. Specifically, it is electrically connected with the anode(s) of the cell(s) 112. Accordingly, in the method 130, the voltage monitored by the monitoring block 136 (e.g., at the pin labeled $V_{Cell}$) is measured with respect to the negative electrode (i.e., anode(s)) of the cell(s) 112 (e.g., applied to the pin labeled $V_{SS}$). Such an approach relies on an assumption that the negative electrode (i.e., anode(s)) of the cell(s) 112 (e.g., $V_{SS}$) has a potential of approximately 0 V and remains at approximately 0 V. Under such an assumption, the condition of the decision block 140 may be met when $V_{Cell} - V_{SS} = \Delta V_{REG}$. However, should changes occur to the cell(s) 112, the potential of the anode may not remain constant. For example, if the potential of the anode increases, then the potential at the pin labeled $V_{SS}$ of the management circuitry 110 will increase as well. Under such conditions, to meet the criterion specified by $\Delta V_{REG}$, the potential of the cathode must be higher as applied to the pin labeled $V_{Cell}$ of the management circuitry 110. Depending on the amount of increase in potential of the anode, the potential of the cathode may exceed a recommended upper limit for the cathode.

As shown in the example of FIG. 1, the method 130 continues to the commencement block 144 for commencing a constant voltage (CV) phase when the decision block 140 decides that the monitored voltage (e.g., $\Delta V = V_{Cell} - V_{SS}$) is equal to the specified voltage (e.g., $\Delta V_{REG}$). The plot 122 (FIG. 1B) shows a time for commencing a constant voltage (CV) phase.

For the constant voltage (CV) phase, the method 130 continues in a monitor block 148 for monitoring charge current, which may decline with respect to time as shown in the charge phase plot 120. As shown, another decision block 152 provides for deciding when the constant voltage (CV) phase should terminate. For example, a storage register 150 may store a value for a termination current $I_{TERM}$. In such an example, the decision block 152 may receive the $I_{TERM}$ value from the storage register 150 and compare it to a monitored current value from the monitor block 148. As the monitored current diminishes during the constant voltage (CV) phase, it eventually reaches the $I_{TERM}$ value, upon which the method 130 terminates in a termination block 156 (e.g., to terminate the recharge process commenced at block 132).

Figure 2:
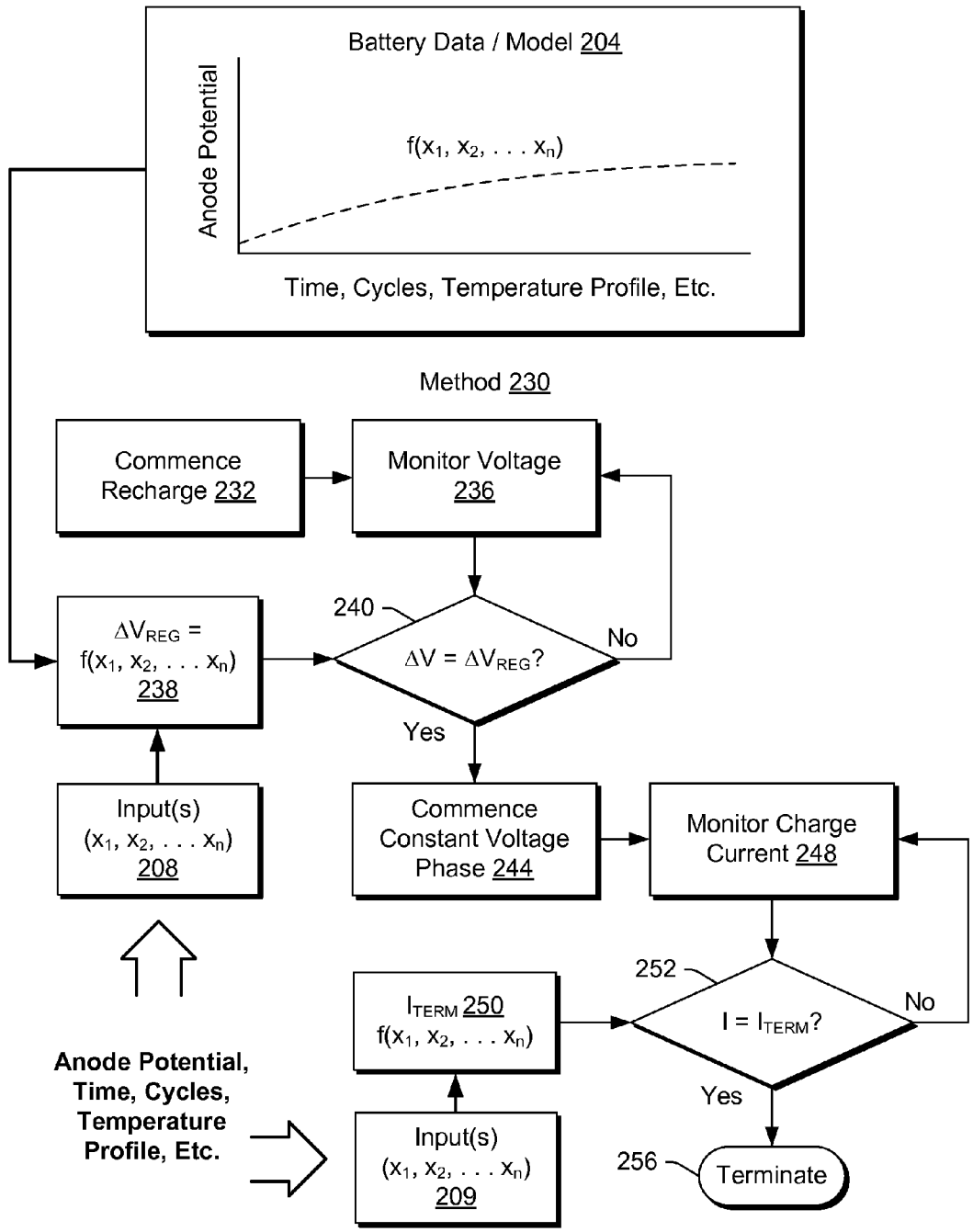
FIG. 2 is a diagram of an example of a method.

FIG. 2 shows an example of a plot 204 of battery data or a battery model for an anode potential with respect to one or more factors. A dashed curve indicates that anode potential may rise with respect to one or more factors. As an example, the one or more factors act to alter chemistry, stress, etc., of a lithium-ion cell in a manner that causes anode potential to increase. For example, an anode potential can increase as a cycle number for discharge-charge cycling increases. While an anode potential is shown, an approach may include data or a model for a cathode potential, electrolyte decomposition threshold, or any combination of models or data for an anode, a cathode and electrolyte (e.g., cell chemistry, etc.).

As an example, an advanced battery health assessment method can act to extend cycle life by monitoring and controlling conditions that affect cell electrode degradation, for example, using one or more algorithms based on cell chemistry behavior during cycling and usage scenarios. Such an approach may account for modeled, measured or modeled and measured behavior of an individual electrode or individual electrodes during cycling, optionally in conjunction with cell voltage, impedance, cell voltage and impedance, etc. As an example, one or more algorithms may use known preconditions based on particular cell chemistry or can be based on real time monitoring of cell chemistry using a reference.

As to an individual cell, voltage may be determined as the difference in energy potential between the anode and the cathode: $\Delta V(cell)=V(cathode)-V(anode)$. As mentioned, to limit cathode degradation, potential should not reach or exceed an upper limit (e.g., defined by an electrode dissolution threshold). Further, a condition may be imposed as to one or more electrolyte decomposition thresholds. A control algorithm may act such that cathode voltage does not reach a cathode dissolution threshold $V^*(cathode)$ (e.g., $V(cathode) < V^*(cathode)$).

As mentioned with respect to the example of FIG. 1, the management circuitry 110 relies on a constant $\Delta V(cell)$ (e.g., per $\Delta V_{REG}$) for each charge cycle: $\Delta V(cell)=V(cathode)-V(anode)=C$ or $\Delta V_{REG}$. As mentioned, $\Delta V_{REG}$ may be set to 4.2 V for a lithium cobalt based cell cathode. Thus, an algorithm for the management circuitry 110 may be represented by the following equation: $V(cathode)=C+V(anode)<V^*(cathode)$, where the anode potential V(anode) is assumed to remain constant (or zero) during the life of the cell.

However, as indicated in the plot 204, such an assumption may be a poor assumption. To overcome this assumption, a model, measurements, or a model and measurements may be implemented to provide a value for V(anode) (e.g., during life of a cell or cells). As an example, through use of a model (e.g., one or more equations, a data table, etc.), a method may include predicting anode potential variation and, for example, set one or more parameters in advance or in real time in an effort to limit cell degradation and prolong cell cycle life.

As an example, an algorithm may act to extend battery life by knowing when and how to change the charging conditions. As an example, circuitry may provide for monitoring state of health of a battery and limiting one or more conditions that may lead to safety issues, longevity issues, etc. As an example, in conjunction with a reference electrode that provides a reference potential, circuitry may provide for monitoring at least one of cathode-to-reference voltage and anode-to-reference voltage in real time (e.g., or periodically) and, in turn, may provide for adjusting one or more charging parameters (e.g., to avoid one or more regimes that may be known to accelerate electrode degradation, etc.).

As an example, a cathode may include $LiCoO_2$ that adopts a layered rock-salt structure based on a close-packed network of oxygen atoms with the $Li^+$ and $Co_3^+$ ions ordering on alternating (111) planes of the cubic rock-salt structure, which introduces a slight distortion of the lattice to hexagonal symmetry.

As an example, an anode may include graphite on a copper foil. Graphite may host guest species to form a so-called graphite intercalation compound (GIC). For example, a GIC can reversibly intercalate lithium ions responsive to electrochemical forces. The electrochemical lithium intercalation properties of graphite depend on, for example, crystallinity, morphology and orientation of crystallites. Graphite material can determine both potential and current characteristics of intercalation reaction and also tendency for solvation of $LiC_n$ compounds.

Being a carbonaceous material of layered structure, a basic building block for graphite is a planner sheet of carbon atoms arranged in a hexagonal array, known as a graphene layer. Graphene layers can weakly bonded together by van der Waals forces, stack in an ABAB sequence along a c-axis with an interplane distance of about 0.3354 nm. Such a structure results in hexagonal graphite (e.g., 2H graphite). In a less common polymorph, ABCABC stacking occurs, termed rhombohedral or 3R graphite.

Lithium intercalation into graphite can involve a staging phenomenon, for example, where intercalated lithium ions are known to stay in-between graphene layer(s). Stage can refers to a number of graphene layers that lie between alternate lithium layers. When lithium is intercalated into graphite, the following phases, e.g., dilute stage-1, stage-4, liquid-like stage-2L, stage-2 and stage-1 may be successively formed. Such stages can be monitored and controlled by electrochemical reduction of carbons in lithium ion containing electrolytes. A fully lithiated graphite exhibits a potential close to the potential of lithium metal.

GIC in-plane ordering of guest species with respect to adjacent graphene sheets can form a "superlattice structure". For example, structure of stage-1 Li-GIC gives a composition of $LiC_6$, which restricts the theoretical capacity of graphite to 372 mAh/g. Properties of graphite can be changed upon lithium intercalation. For example, stacking order of graphene layers in graphite shifts to AAAA during lithium intercalation reaction and interplane distance of $LiC_6$ moderately increase from about 0.3354 nm to about 0.370 nm. The increase in the interplanar spacing may indicate that graphite experiences volume expansion during intercalation and volume contraction during deintercalation. Volume expansion and contraction can cause disconnection of electrode particles from a current collector and consequently may result in irreversible capacity.

Graphite (e.g., graphitic carbons) finding use in Li-ion cell batteries can appear in a variety of shapes and morphologies (e.g. beads, fibers, flakes, etc.). As an example, mixed with PVDF and conductive carbon, graphitic carbon may be coated on copper foil that acts as a current collector to make a graphite electrode for Li-ion cell batteries.

As an example, a lithium-ion cell or cells may include a reference electrode (e.g., in addition to a positive electrode and a negative electrode). A reference electrode, by definition, aims to maintain a stable potential (e.g., a constant value relative to a solution phase). A reference electrode may facilitate potentiometric measurements of another electrode (e.g., a positive electrode or a negative electrode).

As to examples of a reference electrode or reference electrodes for a lithium-ion cell, a reference electrode may be a piece of lithium foil; lithium on copper, nickel, aluminum or platinum; a stainless steel sheet; a copper grid; etc. As to copper, as an example, for a lithium-ion cell suitable for use in a computing device (e.g., a notebook computer), a copper wire having a diameter of about 80 micrometers with an insulation layer and an exposed portion may be positioned between a positive electrode and a negative electrode and separated from the electrodes by a separator disposed between the copper wire and the negative electrode and a separator disposed between the copper wire and the positive electrode. To obtain a uniform lithium deposit on the exposed portion of such a copper wire, a galvanostatic current may be first applied between the copper wire and the positive electrode and, subsequently, between the copper wire and the negative electrode. For a copper wire having a diameter of about 80 micrometers, such a process can deposit a layer of lithium having a thickness of about 4 micrometers. As an in situ process, it may diminish electrode capacity, for example, by about $1 \times 10^{-3}$ mA·hrs for a cell having a nominal capacity of about 300 mA·hrs. For a fully charged Li-ion battery, it is to be expected that the potential difference between $Li_xCoO_2$ ($0.5 \leq x \leq 1$) and the lithium metal reference electrode is above 4.2 V, while that of $Li_yC_6$ ($0 \leq y \leq 1$) and lithium reference electrode is around 0.08 V.

As an example, a reference electrode may assist with electrochemical impedance spectroscopy (EIS). EIS may allow for determination of series resistance, diffusion/migration resistance through an SEI layer, charge transfer resistance and solid-state diffusion coefficient of lithium ion intercalation/deintercalation processes, which may be helpful in understanding complex electrochemical processes occurring inside a lithium-ion cell or cells. Where a lithium-ion cell includes a reference electrode, as an example, three-electrode EIS measurements may be performed; noting, for example, that two-electrode EIS measurements may be performed (e.g., where a cell includes or does not include a reference electrode).

A dissertation by Zhou, "Lithium Metal Microreference Electrodes and their Applications to Li-ion Batteries" (Eindhoven University Press, 2007) reported data for electrode potentials (e.g., measured as voltages with respect to a copper wire reference electrode) over about seven charge and discharge cycles where each charge and discharge cycle spanned about 100 hours (e.g., about 50 hours for charge and about 50 hours for discharge).

Zhou reported, for a positive electrode, a potential plateau may be associated with a two-phase coexistence region consisting of two hexagonal phases of slightly different sizes; whereas, later, potential may include (e.g., monotonically), as being associated with a single-phase reaction of the second hexagonal phase. Over about seven cycles, data reported by Zhou indicates that reversibility of the positive electrode for lithium intercalation and deintercalation may occur with relatively constant minima and maxima.

As to the potential profile of the negative electrode Zhou reported that, during a cycle, potential drops to a small plateau (e.g., which may be attributed to formation of the stage-4 lithiated graphite) and as intercalation progresses, it continues to decline with two additional plateaus (e.g., being associated with stage-2 lithiated graphite and stage-1 lithiated graphite). Over about seven cycles, data reported by Zhou indicates that reversibility for lithium-ion intercalation and deintercalation may occur with relatively constant minima and maxima.

Zhou also reported that potential of a negative electrode with respect to a reference electrode has been found to be mainly responsible for battery voltage change at the beginning of charge and at the end of discharge; whereas, potential of a positive electrode with respect to the reference electrode has been found to dominant battery voltage at the end of charge and the beginning of discharge.

In the example of FIG. 2, the method 230 includes a commencement block 232 for commencing a recharge, a monitoring block 236 for monitoring voltage, and a decision block 240 for deciding whether a monitored voltage (e.g., $\Delta V = V_{Cell} - V_{SS}$ or other voltage) is equal to a specified voltage ($\Delta V_{REG}$). If the decision block 240 decides that the monitored voltage is not equal to the specified voltage ($\Delta V_{REG}$), the method 230 continues at the monitor block 236, otherwise, the method 230 continues at another commencement block 244 for commencing a constant voltage (CV) phase. During the constant voltage (CV) phase, the method 230 includes a monitor block 248 for monitoring current. Another decision block 252 provides for deciding whether a monitored current is equal to a specified current ($I_{TERM}$). If the decision block 252 decides that the monitored current is not equal to the specified current ($I_{TERM}$), then the method 230 continues at the monitor block 248, otherwise, the method 230 continues to a termination block 256 for terminating the recharge process of the method 230.

In the example of FIG. 2, the decision block 240 may receive input from an information block 238, which may provide information based on one or more measurements, one or more models, a combination of one or more measurements and one or more models, etc. As an example, an input block 208 may provide one or more inputs to the information block 238. In such an example, the one or more inputs may include anode potential (e.g., negative electrode potential), time, cycle number, temperature profile, etc. As to anode potential, such a potential may be provided based on one or more measurements (e.g., as a voltage with respect to a reference electrode), one or more models, or a combination of one or more measurements and one or more models. As to a model, a model may be an equation such as a linear equation or a non-linear equation that depend on one or more variables (e.g., number of cycles, cycle duration, temperature, temperature with respect to time, discharge rate, charge rate, discharge time, charge time, a device operational characteristic, a device condition characteristic, etc.).

In the example of FIG. 2, the decision block 252 may receive input from an information block 250. As an example, the information block 250 may receive input from an input block 209. In such an example, the one or more inputs may include anode potential (e.g., negative electrode potential), time, cycle number, temperature profile, etc. As to anode potential, such a potential may be provided based on one or more measurements (e.g., as a voltage with respect to a reference electrode), one or more models, or a combination of one or more measurements and one or more models. As to a model, a model may be an equation such as a linear equation or a non-linear equation that depend on one or more variables (e.g., number of cycles, cycle duration, temperature, temperature with respect to time, discharge rate, charge rate, discharge time, charge time, a device operational characteristic, a device condition characteristic, etc.).

Figure 3:
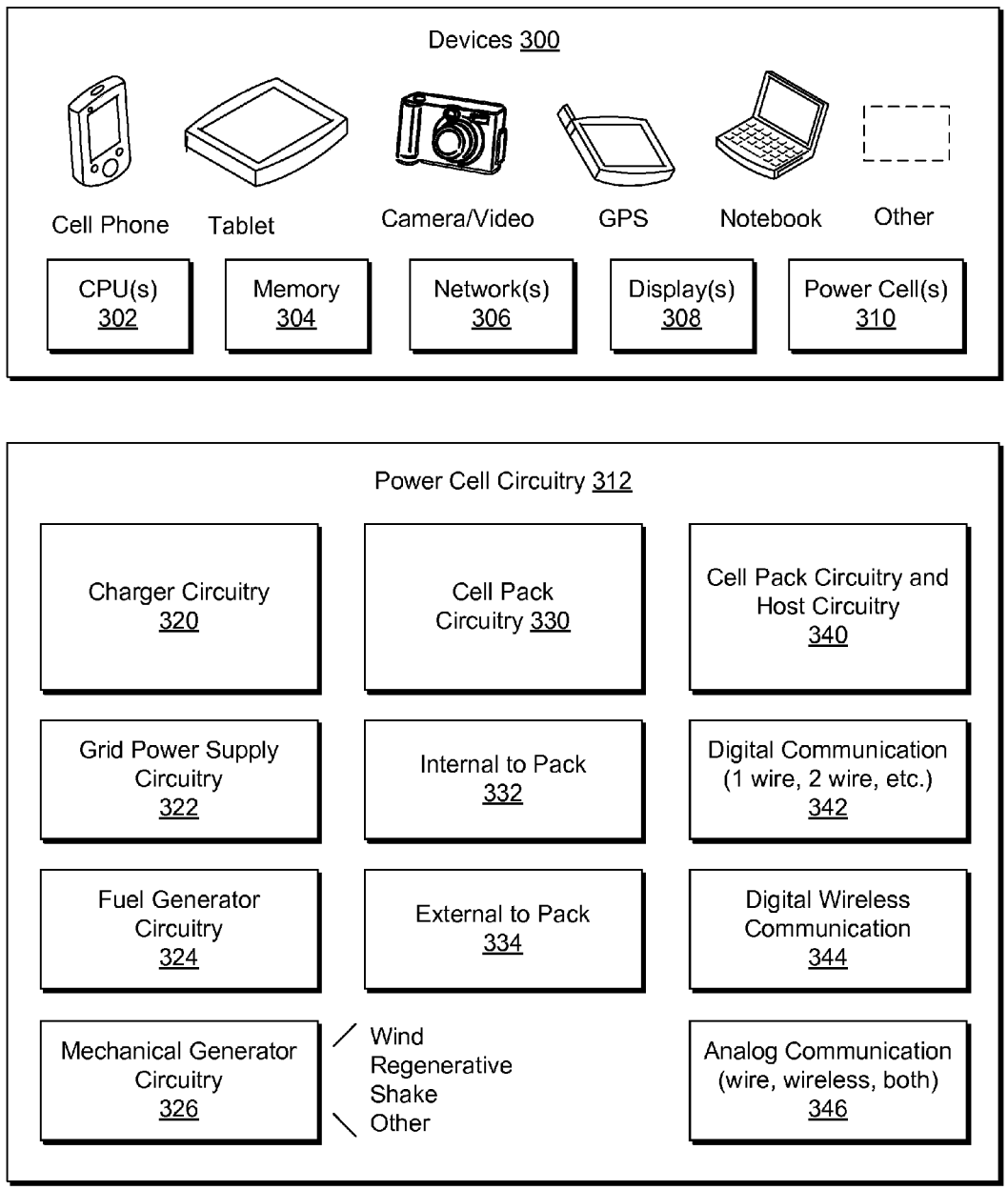
FIG. 3 is a diagram of examples of devices and examples of power cell circuitry.

FIG. 3 shows some examples of devices 300 that may be powered by a lithium-ion cell or cells. For example, a cell phone, a tablet, a camera, a GPS device, a notebook computer, or other device may be powered by a lithium-ion cell or cells. As to other devices, a device may be an electric motor of an electric vehicle or a hybrid vehicle. A device may be an automobile, a toy, a remote control device (e.g., a bomb sniffers, drones, etc.), etc. A device may include one or more processors 302, memory 304, one or more network interfaces 306, one or more displays 308 and, as a power source, one or more lithium-ion cells 310.

A device may include or operably connect to power cell circuitry 312. The power cell circuitry 312 includes circuitry for charging one or more power cells such as one or more lithium-ion cells. The power cell circuitry 312 may be provided as charger circuitry 320, cell pack circuitry 330 or cell pack circuitry and host circuitry 340. As an example, the charger circuitry 320 may include one or more of grid power supply circuitry 322 for connection to a power grid; fuel generator circuitry 324 for connection to a fuel-powered electricity generator (e.g., oil, ethanol, sun, gas, etc.); and mechanical generator circuitry 326 for connection to mechanical equipment such as a wind generator, a regenerative generator (e.g., as in regenerative braking), a shaking generator (e.g., as in a hand motion actuated generator), or other generator (e.g., crank, etc.). As an example, the cell pack circuitry 330 may include one or more of circuitry internal to a cell pack 332 or external to a cell pack 334. As an example, the cell pack circuitry and host circuitry 340 may include one or more of digital communication circuitry 342 for communicating via 1 wire, 2 wires, etc.; wireless digital communication circuitry 344; and analog communication circuitry 346 (e.g., wired, wireless or both).

Figure 4:
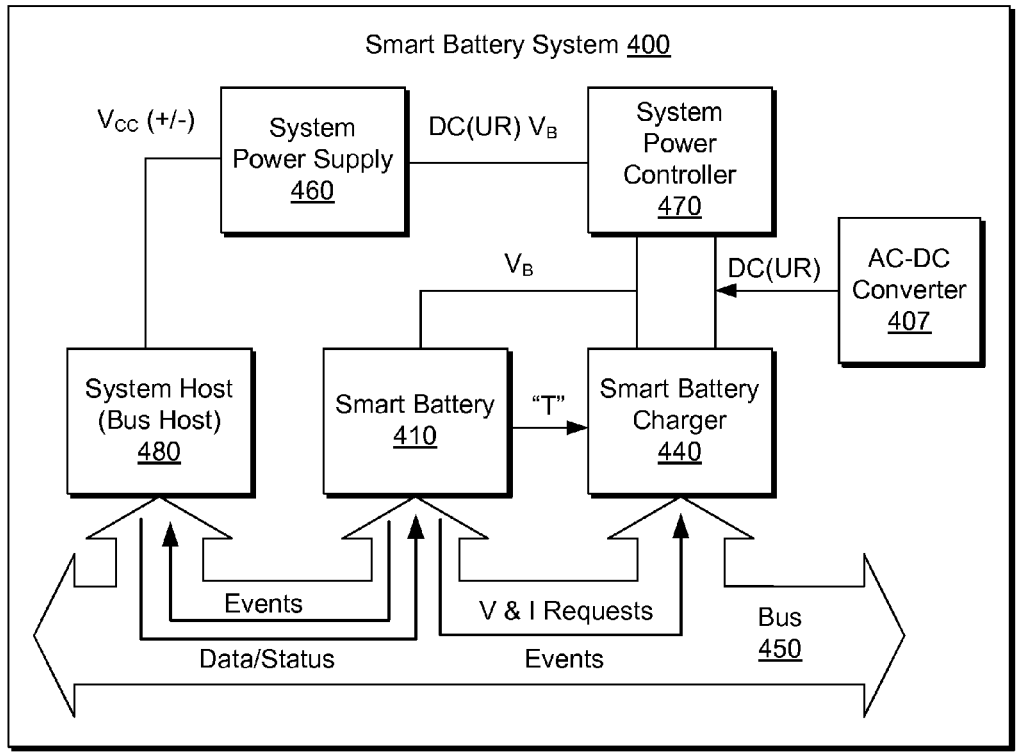
FIG. 4 is a diagram of an example of a smart battery system and an example of a smart battery.
Figure 4:
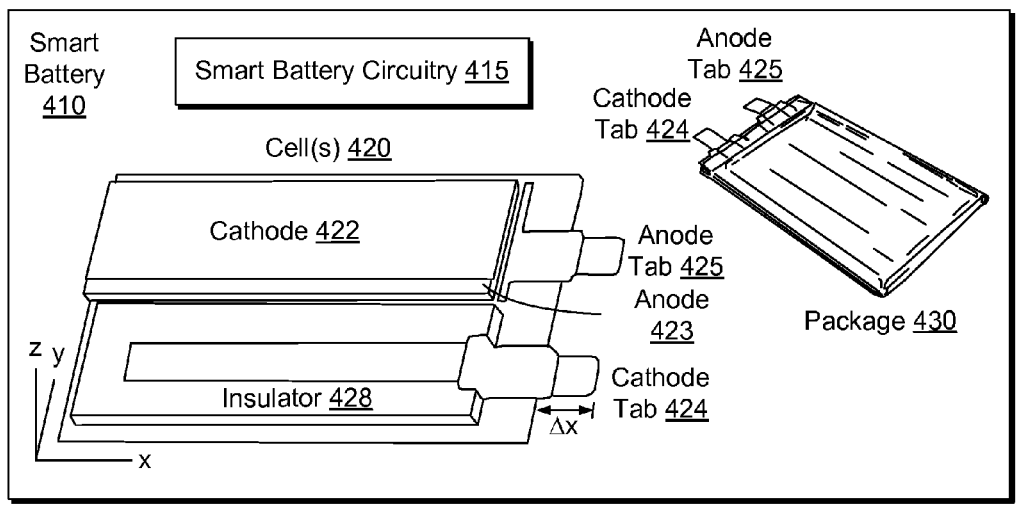

FIG. 4 shows an example a smart battery system (SBS) 400. The SBS 400 includes a smart battery 410, an AC-DC converter 407, a smart battery charger 440, a bus 450, a system power supply 460, a system power controller 470, and a system host 480. The smart battery charger 440 includes charging circuitry that can provide the smart battery 410 with charging current and charging voltage.

In the example of FIG. 4, the system host 480 can include circuitry operable with the bus 450 that allows for signals to be received from circuitry of the smart battery 410, signals to be transmitted to the circuitry of the smart battery 410, signals to be transmitted to the smart battery charger 440, etc. As an example, the system host 480 may include a SMBus host (e.g., "2 wire") or a so-called "1 wire" host that can request information from the circuitry of the smart battery 410, receive information responsive to the request, and transmit the received information to appropriate circuitry of a host.

In the example of FIG. 4, the smart battery charger 440 can receive information from a connection to the bus 450 and from a connection labeled "T". Such information may include events from the smart battery 410, for example, when circuitry in the smart battery 410 detects an event and issues a signal to the bus 450 in response to the detected event. Information received via the "T" connection may relate to temperature of the smart battery 410. As to types of events, an event may be an alarm for charging conditions or temperature conditions which exceed one or more limits stored in memory or otherwise within the circuitry of the smart battery 410.

Examples of system host 480 to smart battery 410 communications can include information as to remaining life, charge time (e.g., how long it will take to charge the smart battery 410), real-time power requirements, battery manufacture, electronic stamping, etc.

The system host 480, for example, under control of an operating system (e.g., or hypervisor), may act to manage both real and virtual devices that can communicate via the bus 450. In addition to the smart battery 410, such devices may include, for example, contrast/backlight controllers and temperature sensors.

As to the smart battery 410, it may include smart battery circuitry 415 and one or more cells 420. As shown in the example of FIG. 4, the one or more cells 420 include a cathode 422, an anode 423, a cathode tab 424, an anode tab 425, an insulator 428, and a package 430. As an example, one of the electronic devices 300 may be powered by the battery 410 (e.g., as housed in the package 430) via electrical connection to the tabs 424 and 425.

As an example, such a smart battery may include one or more reference electrodes. Such an electrode or electrodes may provide for potential measurements with respect to the cathode 422 (e.g., positive electrode) and the anode 423 (e.g., negative electrode), for example, by via a reference electrode tab. A reference electrode tab may be provided at the same end of the package 430 as the cathode tab 424 and the anode tab 425 or it may be positioned elsewhere (e.g., optionally a surface electrode on the surface of the package 430). As an example, a reference electrode may be connected to smart battery circuitry 415 to allow the smart battery circuitry 415 to measure one or more potentials with respect to the reference electrode.

Figure 5:
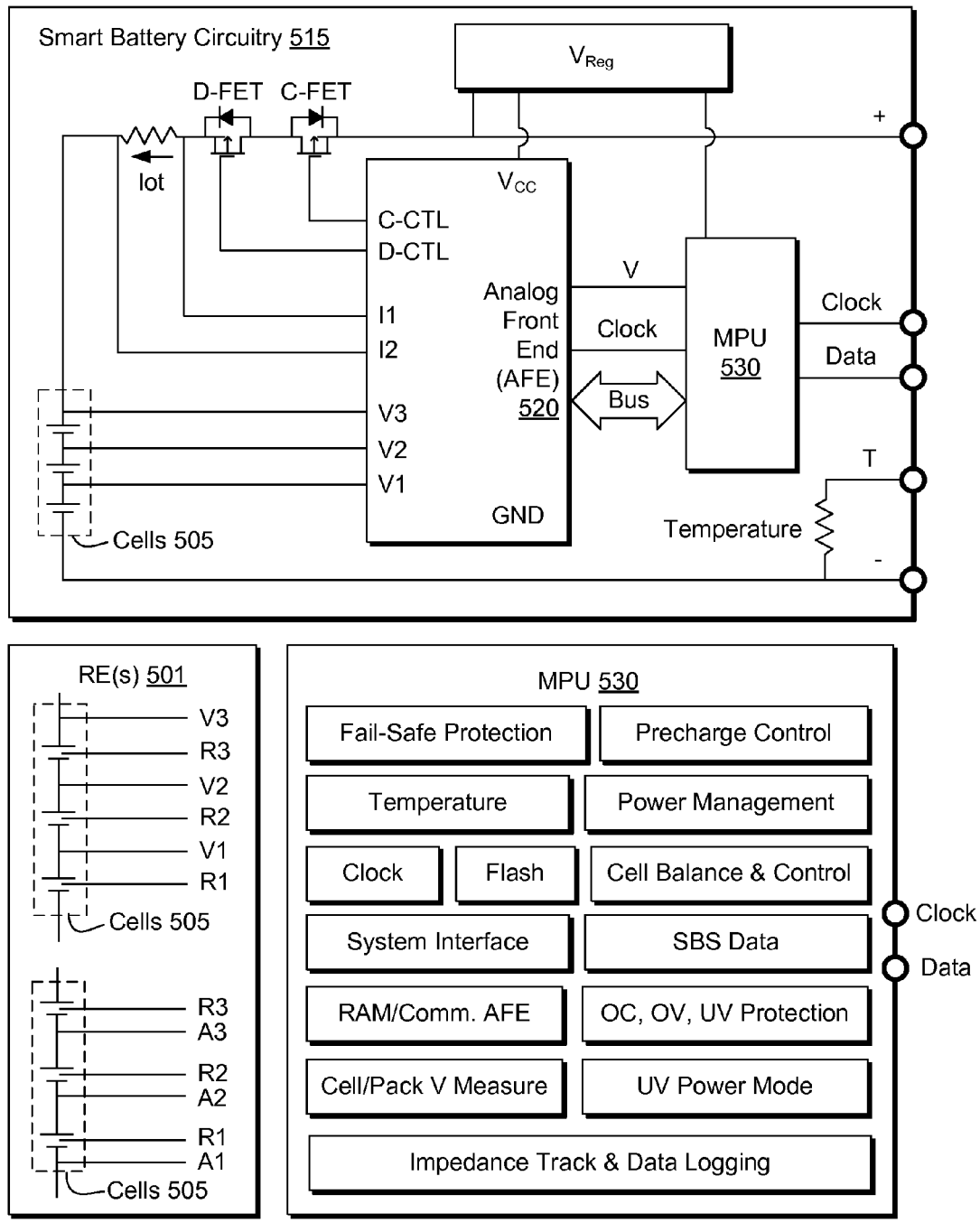
FIG. 5 is a diagram of examples of smart battery circuitry.

FIG. 5 shows an example of smart battery circuitry 515, which may be suitable for use as the smart battery circuitry 415 of FIG. 4. In the example of FIG. 5, the smart battery circuitry 515 includes an analog front end (AFE) 520 and a microprocessing unit (MPU) 530 as well as connection interfaces for a positive connection (+), a negative connection (−), a clock connection, a data connection and a temperature signal connection (T). In the example of FIG. 5, the AFE 520 is configured to charge three cells 505 (e.g., via pins V1, V2 and V3), for example, according to information provided by the MPU 530.

In the example of FIG. 5, the MPU 530 may include various circuits, modules, etc. For example, the MPU 530 may include fail-safe protection circuitry, precharge control circuitry, temperature circuitry, power management circuitry, clock circuitry, flash memory, cell balance and control circuitry, a system interface, a SBS data circuitry, RAM for communication with the AFE 520, overcharge protection circuitry, overvoltage protection circuitry, undervoltage protection circuitry, cell pack voltage measurement circuitry, undervoltage power mode circuitry and impedance track and data logging circuitry.

As an example, the smart battery circuitry 515 may include an interface for electrical connection to a reference electrode of a smart battery. FIG. 5 shows some examples of connections for reference electrodes 501, which may be provided with connections for cathode electrodes (e.g., positive electrodes), connections for anode electrodes (e.g., negative electrodes) or a combination of connections for cathode electrodes and anode electrodes. In the example of FIG. 5, the smart battery circuitry 515 may further include an AFE that includes one or more terminals (e.g., one or more pins) for connection to a reference electrode for one or more of the three cells 505.

As an example, the MPU 530 may provide for potential measurements using one or more reference electrodes of one or more cells. In such an example, the MPU 530 may communicate with the AFE 520 for performing such potential measurements. As an example, the MPU 530 may provide for communication of one or more potential measurements or information based at least in part thereon via the data connection. As mentioned with respect to FIG. 4, such a data connection may be a bus connection to a host system (e.g., a host device). Accordingly, the smart battery circuitry 515 may provide for control based at least in part on one or more potential measurement acquired using one or more reference electrodes of one or more cells.

Figure 6:
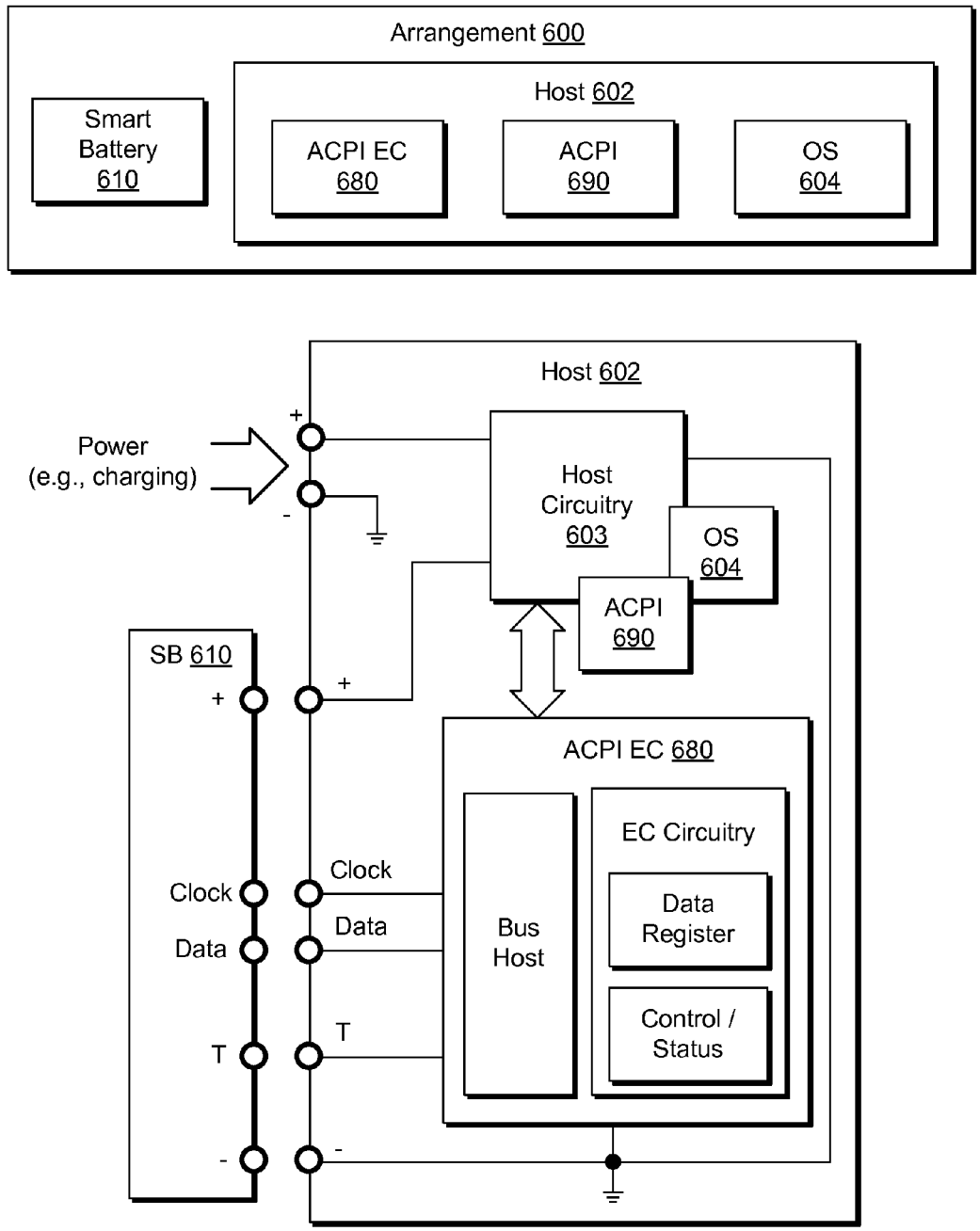
FIG. 6 is a diagram of an example of an arrangement of components of a system.

FIG. 6 shows an example of an arrangement 600 that includes a host 602, host circuitry 603 and a smart battery 610. In the example of FIG. 6, the host 602 includes an operating system 604 (e.g., executable using one or more processors and memory), an advanced configuration and power interface embedded controller (ACPI EC) 680 and an ACPI layer 690.

The ACPI layer 690 may be provided as a software-based interface that defines a power management and configuration mechanism for hardware and operating systems. The ACPI layer 690 may provide for power management such as OS-directed power management (OSPM). The ACPI layer 690 may operate according to states (e.g., as a state machine). The ACPI layer 690 may operate according to one or more policies (e.g., set by a policy manager) that provide rules for one or more states and provide for interaction with one or more device drivers, for example, to provide commands, instructions, etc., related to one or more devices (e.g., including a smart battery). Such an approach may provide a state machine where relevant information causes a change in state, for example, according to one or more policies.

As to the embedded controller (EC) 680, it may provide for control of various equipment (e.g., human interaction equipment), one or more background tasks, etc. For example, the EC 680 may be circuitry of a notebook computer that manages traffic across one or more buses for peripheral, built-in or other devices. The EC 680 may operate according to firmware, which may be associated with particular BIOS. As an example, EC firmware may be altered (e.g., upgraded, etc.) via information transmitted via a network connection, loaded via a computer-readable storage medium, etc.

As an example, an EC may be a H8S family EC such as the H8S/2161 BV of the H8S/2140B group (e.g., as marketed by the Renesas Electronics Corporation, Santa Clara, Calif.). As an example, an EC may be mounted on a motherboard of a computer and include functionality for power management (e.g., for a battery charger, a smart battery, one or more cooling fans, etc.). As an example, communication may occur between a chipset and an EC via a low pin count (LPC) host. As an example, communication may occur between an EC and a device via an $I^2C$ bus (e.g., a SMBus).

A so-called SMBus control method interface (CMI) allows an EC to act via an ACPI layer, for example, via ACPI control methods where a driver allows for use of SMBus CMI objects by an operating system, system software (e.g., hypervisor or other), user applications, etc. As an example, a SMBus CMI can allow for device control via EC-based or non-EC-based SMBus host controller hardware.

FIG. 6 also shows a diagram of the arrangement 600 with some additional details such as physical interfaces for connection to a power source for charging the smart battery 610 (e.g., an AC/DC power adapter, a DC/DC power adapter, etc.) and for connection to the smart battery 610 (e.g., as seated in a socket or bay of a device). As shown, the ACPI EC 680 can include EC circuitry and a bus host. The EC circuitry may include data registers, control and status circuitry while the bus host provides for communication via an interface of the smart battery 610 (see, e.g., the data connector and data line of the MPU 530 in the example of FIG. 5).

As an example, the arrangement 600 may be configured to implement a method such as the method 230 of FIG. 2. For example, one or more of the components in the arrangement 600 may provide for managing charging of one or more cells of the smart battery 610. In the arrangement 600, the host 602 may communicate with the smart battery 610 via the bus host of the ACPI EC 680 where the smart battery 610 includes, for example, a MPU and an AFE such as the MPU 530 and the AFE 520 of FIG. 5. As an example, the arrangement 600 may be configured to implement one or more of the method illustrated in the plots 1010 and 1030 of FIG. 10 (e.g., or otherwise described herein).

Figure 7:
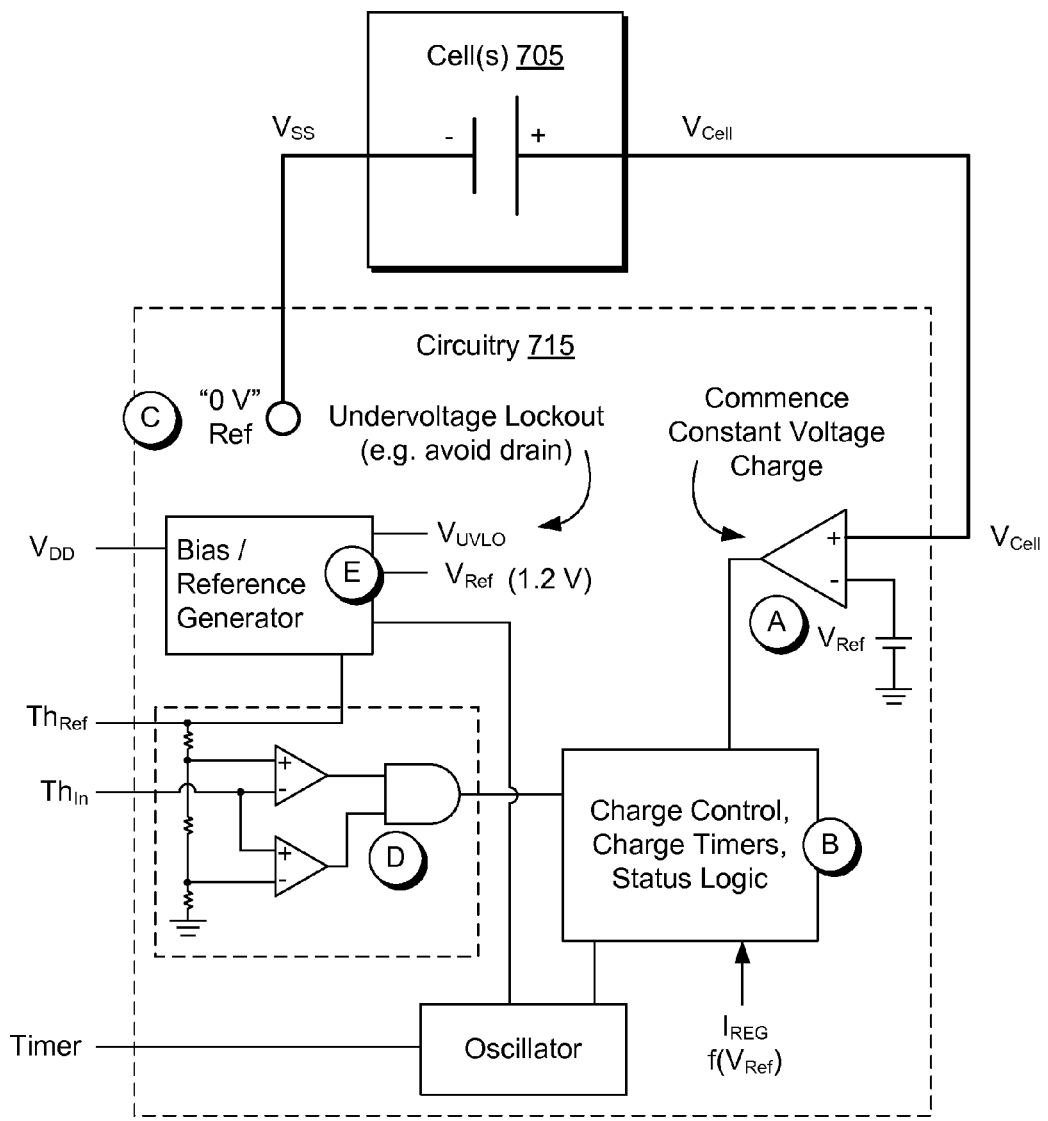
FIG. 7 is a diagram of an example of an arrangement of components of a system and interaction therewith.

FIG. 7 shows an example of an arrangement 700 that includes circuitry 715 and one or more cells 705. In the example of FIG. 7, letters A, B, C, D, and E identify particular portions of the circuitry 715 that may provide for control of charging the one or more cells 705. Further, where the one or more cells 705 include one or more reference electrodes, the circuitry 715 may include one or more connectors for connecting to the one or more reference electrodes. In such an example, signals provided via the one or more connectors may provide for control of charging the one or more cells 705.

As to point A, circuitry may be provided that alters the $V_{Ref}$ signal at the comparator that acts to commence a constant voltage (CV) phase of a recharge process. In turn, the signal provided to other circuitry may alter a recharge process for the one or more cells 705.

As to point B, circuitry may be provided that, for example, tracks one or more parameters germane to recharging of the one or more cells 705. As an example, consider a counter that tracks a number of charge cycles (e.g., recharge cycles). As the number of charge cycles increases, the circuitry may act to alter a recharge process (e.g., optionally according to a model or models that include charge cycle as a variable).

As to point C, circuitry may be provided that, for example, alters the "0 V" reference of the circuitry 715. As an example, the 0 V reference may be floated upward with respect to time, number of charge cycles, etc.

As to point D, circuitry may be provided that, for example, alters temperature compensation circuitry in a manner that acts to account for changes that occur or may be expected to occur in the one or more cells 705 as a function of time, charge cycle, usage, etc. As shown, output from temperature compensation circuitry may be directed to other circuitry (e.g., charge control, charge timer, status logic circuitry) that controls one or more charge process parameters (e.g., $\Delta V_{REG}$ as in the method 230 of FIG. 2).

As to point E, circuitry may be provided that alters the generation of the reference potential ($V_{Ref}$) for the circuitry 715. As noted, the reference potential ($V_{Ref}$) is applied to the comparator that acts to generate a signal to commence a constant voltage (CV) phase of a charge process.

Where the arrangement 700 includes one or more reference electrodes for the one or more cells 705, the circuitry 715 may act to adjust a charge process based at least in part on potentials measured for an anode electrode of the one or more cells 705, a cathode electrode of the one or more cells 705 or both. As an example, a measured anode electrode potential may be used to alter the reference potential ($V_{Ref}$), which, in turn, alters operation of the comparator that receives the cell potential ($V_{Cell}$) to determine when to commence a constant voltage (CV) phase of a charge process. As an example, such an approach may act to diminish the potential differential that triggers a constant voltage (CV) phase of a charge process. For example, if the potential differential is initially set to X V, as a change occurs in a potential measurement for an anode electrode, this may be diminished to be less than X V. Such a method may act to prevent application of a potential in excess of an upper voltage limit to a cathode electrode of the one or more cells 705.

Figure 8:
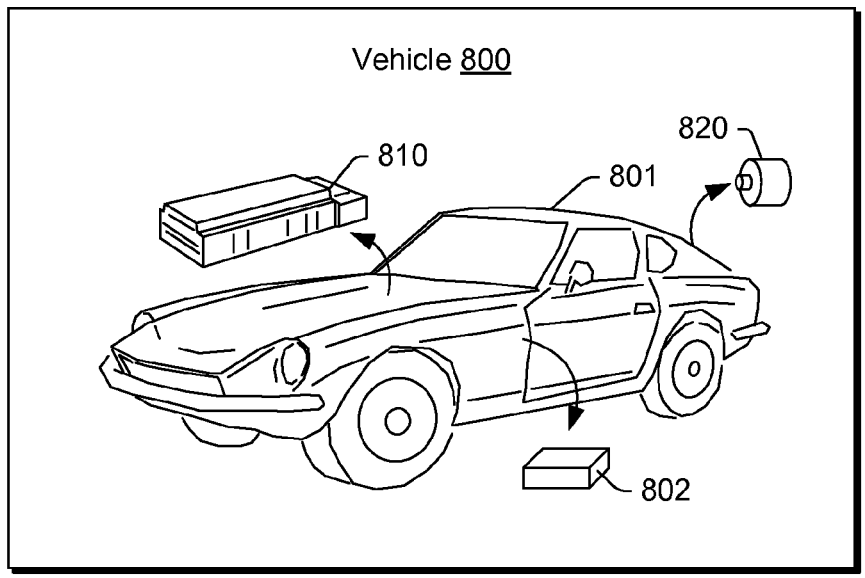
FIG. 8 is a diagram of an example of a vehicle that includes a system with an ECU, a cell pack and an electric motor and generator.
Figure 8:
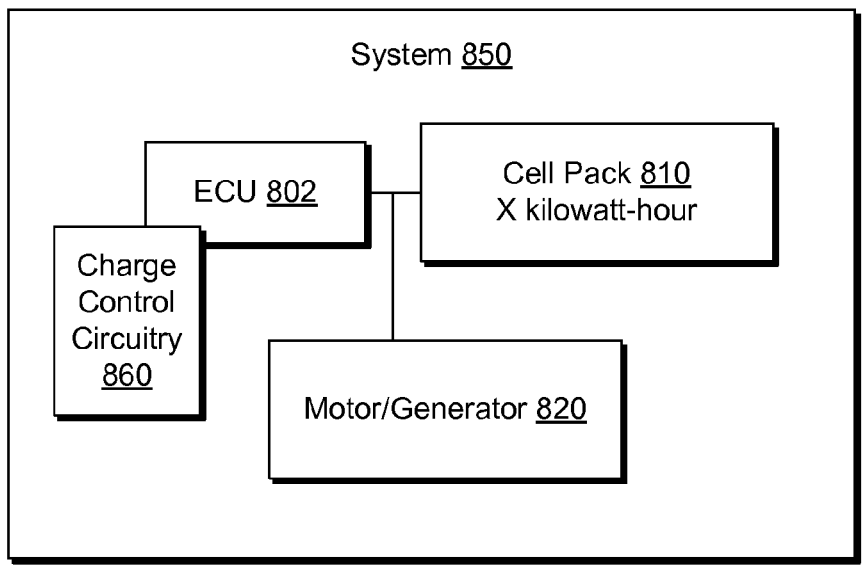

FIG. 8 shows an example of a vehicle 800 that includes an engine control unit (ECU) 802, a cell pack 810 and an electric motor and generator 820. FIG. 8 also shows an example of a system 850 for the vehicle 800 that includes the ECU 802, the cell pack 810, the electric motor and generator 820 and charge control circuitry 860. The vehicle 800 may be a device such as a device 300 of FIG. 3 and include, for example, one or more processors, memory, etc.

As an example, the vehicle 800 may be a hybrid electric vehicle (HEV) where the cell pack 810 is rated at about 1.4 kWh, for example, to absorb braking energy for immediate re-use in an acceleration cycle (e.g., using the electric motor and generator 820 as a generator in a regenerative braking scheme). As an example, the vehicle 800 may be a plug-in hybrid electric vehicle (PHEV) where the cell pack 810 is rated at about 5.2 to 16 kWh, for example, to offer both hybrid and electric drive functions. As an example, the vehicle 801 may be a battery electric vehicle (BEV) where the cell pack 810 is rated at about 24 to 85 kWh to propel the vehicle 800.

In the example of FIG. 8, the charge control circuitry 860 may provide for management of a charge process for one or more cells of the cell pack 810. As an example, the circuitry 860 may act to control a charge voltage during one or more charge processes. As an example, a charge process may occur in response to braking (e.g., for a short period of time during which braking occurs). As another example, a charge process may occur through electrical connection to a power supply grid. As another example, a charge process may occur through a shaft of an internal combustion engine coupled to a generator that generates electrical power. In such examples, the circuitry 860 may control a charge voltage for one or more cells of the cell pack 810 according to a model, a schedule, etc. Depending on the type of charge process, charging of one or more cells in the cell pack 810 may occur in a manner that differs wholly or in part from the charge phases 120 of FIG. 1.

Figure 9:
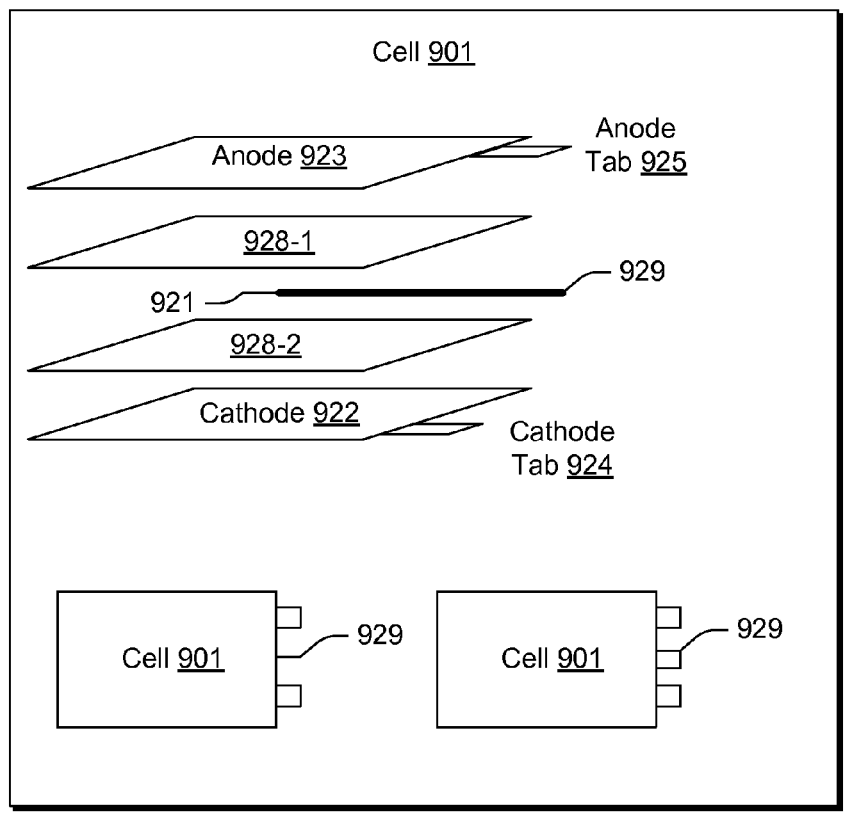
FIG. 9 is a diagram of examples of cells that include one or more reference electrodes.
Figure 9:
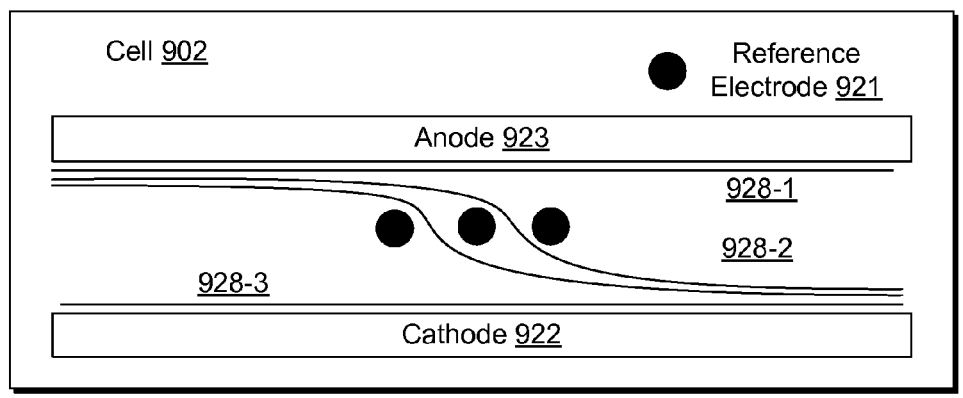

FIG. 9 shows an example of a cell 901 and a cell 902, each including one or more reference electrodes 921. Each of the cells 901 and 902 includes a cathode 922, an anode 923, a cathode tab 924, an anode tab 925, one or more separators 928-1, 928-2 and 928-3. As shown, the cell 901 may include a connector 929 for connection to the reference electrode 921 (e.g., as a wire, a tab, etc.). As an example, one or more reference electrodes 921 may include copper or other material. As an example, a lithium-ion cell may include titanate, for example, with lithium-titanate nanocrystals on an anode surface. Such an anode may exhibit characteristics that differ from a graphite anode. Accordingly, a model, measurements, etc., may be provided that account for the type of anode (e.g., titanate, graphite, etc.).

Figure 10A:
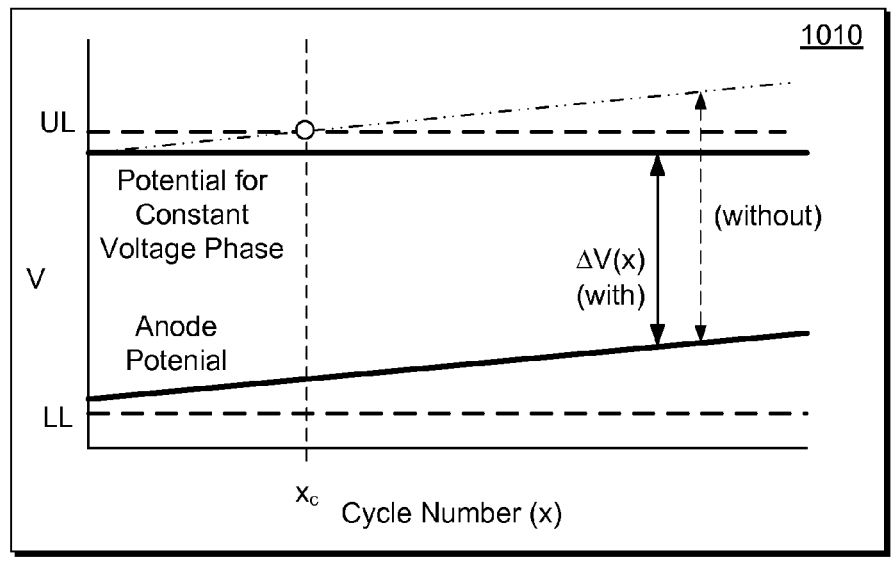
FIG. 10A is a diagram of examples of plots associated with control methods and FIG. 10B is a diagram of examples of plots.
Figure 10A:
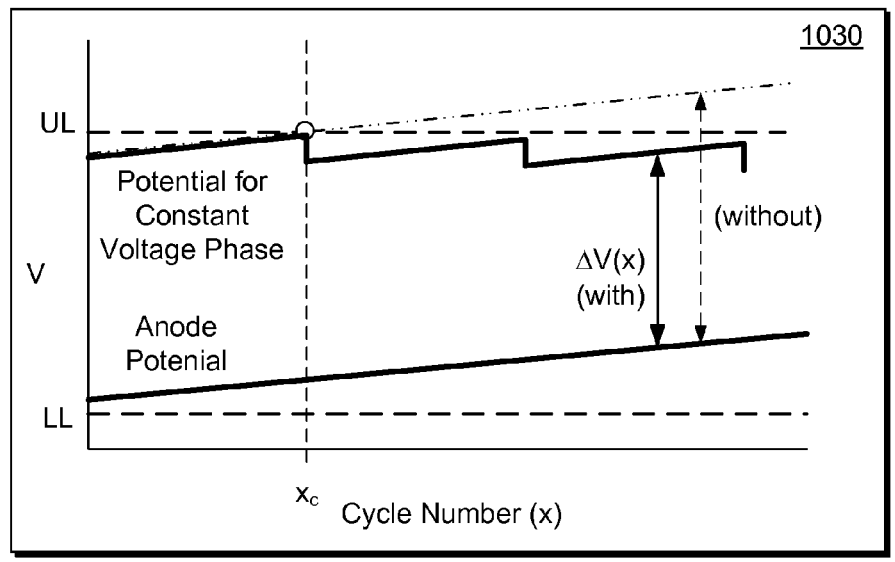
Figure 10B:
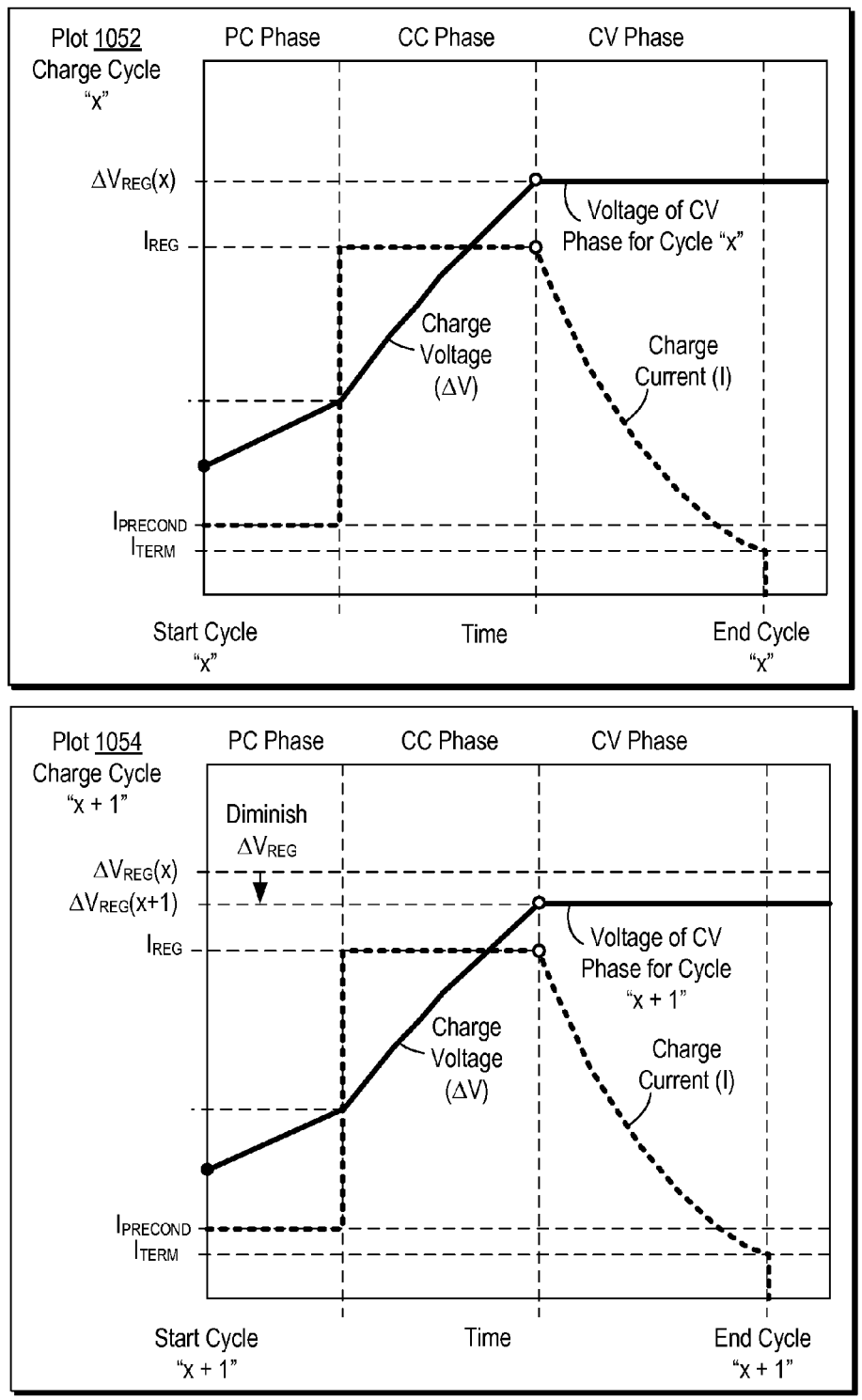

FIG. 10 shows examples in plots 1010 and 1030 for managing potentials versus a variable such as cycle number (FIG. 10A) and example plots 1052 and 1054 for an adjustment to a constant voltage (FIG. 10B). In the example of FIG. 10, the plot 1010 includes a lower limit (LL) for an anode and an upper limit (UL) for a cathode as well as a thick horizontal line representing potential for a constant voltage (CV) phase at a cathode during a charge process and a thick slanted line representing anode potential, which may increase as a function of a variable such as cycle number (x).

In the example of the plot 1010, at a particular cycle number ($x_c$), the potential at the cathode required to commence the constant voltage (CV) phase of a charge process (see a dashed and dotted slanted line) will exceed the upper limit (UL) for the cathode. However, by implementing a control method, the potential differential ($\Delta V$) applied for a recharge process may be diminished, for example, as a function of cycle number (x) or another variable, optionally in combination with cycle number. In such a manner, risk of applying an excessive potential to the cathode may be diminished or avoided. With respect to the method 230 of FIG. 2, the value of $\Delta V$ may be applied as $\Delta V_{REG}$.

In the example of the plot 1030, an adjustment is made periodically, for example, according to a number of cycles. In the example of the plot 1030, the value of the potential at the cathode is allowed to rise over a number of cycles, after which a downward adjustment is made, for example, by diminishing the value of $\Delta V$ (e.g., $\Delta V_{REG}$). The plots 1052 and 1054 (FIG. 1B) shows a downward adjustment that diminishes the value of $\Delta V$ (e.g., in incrementing from charge cycle "x" to charge cycle "x+1").

As an example, $\Delta V$ (or $\Delta V_{REG}$) may be determined on a cycle-by-cycle or other basis. As mentioned with respect to FIG. 2, an advanced battery health assessment method can act to extend cycle life by monitoring and controlling conditions that affect cell electrode degradation, for example, using one or more algorithms based on cell chemistry behavior during cycling and usage scenarios. Such an approach may account for modeled, measured or modeled and measured behavior of an individual electrode or individual electrodes during cycling, optionally in conjunction with cell voltage, impedance, cell voltage and impedance, etc. As an example, one or more algorithms may use known preconditions based on particular cell chemistry or can be based on real time monitoring of cell chemistry using a reference.

As an example, anode potential of a cell may be provided as a function of charge cycle number (e.g., "f(x)") and a condition may be established for a critical charge cycle number (e.g., "$x_c$") based on the function and an upper limit for a cathode potential (e.g., "UL"). In such an example, where anode potential increases with respect to charge cycle number, the condition for a critical charge number may be represented by an equation: $\Delta(x_c)=0=UL-f(x_c)-\Delta V(1)$, where $\Delta V(1)$ may be a value for a first charge cycle (e.g., a new cell). In such an example, a method may commence adjustment of $\Delta V$ (or $\Delta V_{REG}$) once the critical charge cycle number $x_c$ has been reached (or before to provide a safety margin). For example, $\Delta V$ may be decreased as charge cycle number x increases beyond the critical charge cycle number $x_c$ to help prevent exceeding the upper limit UL for the cathode potential. As mentioned, anode potential of a cell may be provided as a function of one or more variables (e.g., charge cycle number, age, temperature-time profile, etc.).

As an example, given a priori knowledge of anode potential, a function, a schedule, etc., may be provided for cathode potential as a function of one or more variables. As an example, a function may be provided for anode potential and another function may be provided for cathode potential. In such an example, a $\Delta V$ (or $\Delta V_{REG}$) may be defined as the difference between these two potentials (e.g., on a cycle-by-cycle or other basis). As another example, $\Delta V$ (or $\Delta V_{REG}$) may be provided as a function of one or more variables (e.g., $\Delta V(x_1, x_2, \ldots x_n)$).

As an example, a method may control $\Delta V$ (or $\Delta V_{REG}$) on a cycle-by-cycle basis from a first charge cycle or from a latter charge cycle. In such an example, the corresponding cathode potential may start at a value below an upper limit UL for a cathode potential to a value near or at the upper limit UL for the cathode potential.

As mentioned, changes may occur to a cell with respect to one or more factors. As an example, discharge-charge cycling can alter chemistry, structure, etc. As an example, as cycle number increases, impurities may be concentrated at an anode, a cathode or at an anode and a cathode, which, in turn, impacts cell power storage capacity. As another example, as cycle number increases, a structure may decompose at an anode, a cathode or at an anode and a cathode, which, in turn, impacts cell power storage capacity. As an example, charge control circuitry may account for one or more of such changes by adjusting a charge voltage, which, in turn, may avoid certain types of damaging conditions (e.g., exceeding an upper limit for a cathode potential). As an example, charge control circuitry may be compensation circuitry that compensates for changes that occur in one or more cells in an effort to extend cell life, etc.

As an example, a method can include receiving a potential value of a negative electrode of a lithium-ion cell; and for a cell charging process for the lithium-ion cell, adjusting a constant voltage phase voltage based at least in part on the potential value of the negative electrode. In such a method, the receiving may include measuring the potential value of the negative electrode with respect to a reference electrode of the lithium-ion cell. As an example, a negative electrode may include a carbon matrix (e.g. graphite). As an example, a method may include powering a computer with the lithium-ion cell, powering cellular communication circuitry with the lithium-ion cell, etc.

As an example, a method can include powering a vehicle with a lithium-ion cell; receiving a potential value of a negative electrode of a lithium-ion cell; and for a cell charging process for the lithium-ion cell, adjusting a constant voltage phase voltage based at least in part on the potential value of the negative electrode. In such an example, powering can include powering an electric motor operatively coupled to a drive train of the vehicle.

As an example, a system can include circuitry powered by DC power; a lithium-ion cell that supplies DC power; and circuitry that adjusts a constant voltage phase voltage for a cell charging process for the lithium-ion cell based on information indicative of an increase in potential of a negative electrode of the lithium-ion cell. In such a system, the information indicative of an increase in potential of the negative electrode can include a measured the potential value of the negative electrode with respect to a reference electrode of the lithium-ion cell.

As an example, information indicative of an increase in potential of a negative electrode can include a schedule stored in memory of the system based on measurements of the potential value of the negative electrode with respect to a reference electrode of the lithium-ion cell. In such an example, the schedule can include potential values for the negative electrode with respect to one or more parameters (e.g., recharge cycles, time, temperature, etc.). As an example, a schedule can include potential values with respect to one or more of recharge cycle number, time and temperature.

As an example, a system can include information indicative of an increase in potential of a negative electrode as a value derived from a model of negative electrode potential with respect to one or more parameters (e.g., recharge cycles, time, and temperature). As an example, a model may model potential with respect to one or more of recharge cycle number, time and temperature.

As an example, a system can include an electric motor as circuitry powered by DC power provided by one or more lithium-ion cells. As an example, a system can include a computer as circuitry powered by DC power provided by one or more lithium-ion cells. As an example, a system can include cellular communication circuitry powered by DC power provided by one or more lithium-ion cells.

As an example, a lithium-ion cell system can include a lithium-ion cell that includes a carbon matrix anode, a cathode and a reference electrode; circuitry to measure potential of the carbon matrix anode with respect to the reference electrode; and circuitry to adjust a constant voltage phase voltage for recharging the lithium-ion cell based at least in part on the measured potential of the carbon matrix anode. Such a system may also include a bus interface for receipt of information for the circuitry to adjust the constant voltage phase voltage. As an example, circuitry to adjust a constant voltage phase voltage may adjust the constant voltage phase voltage based on information received via a bus interface. In such an example, the bus interface may be coupled to a computer bus or a vehicle bus (e.g., or other bus).

As an example, where a constant voltage (CV) phase voltage is to be adjusted, such an adjustment may adjust, for example, the parameter $\Delta V_{REG}$ (e.g., as shown in the method 230 of FIG. 2) as it may be considered a constant voltage (CV) phase voltage. As indicated, the parameter $\Delta V_{REG}$ acts to decide when a constant voltage (CV) phase of a charge (e.g., recharge) process commences; noting that the voltage may be maintained at that value while current decreases to an acceptable level (e.g., to trigger termination of a charge process).

As an example, where a charge process implements a technique that includes an alternative to a constant voltage (CV) phase, one or more techniques (e.g., methods, circuitry, etc.) described herein may be adapted for use in such a charge process (e.g., for cell life, safety, performance, etc.).

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 11:
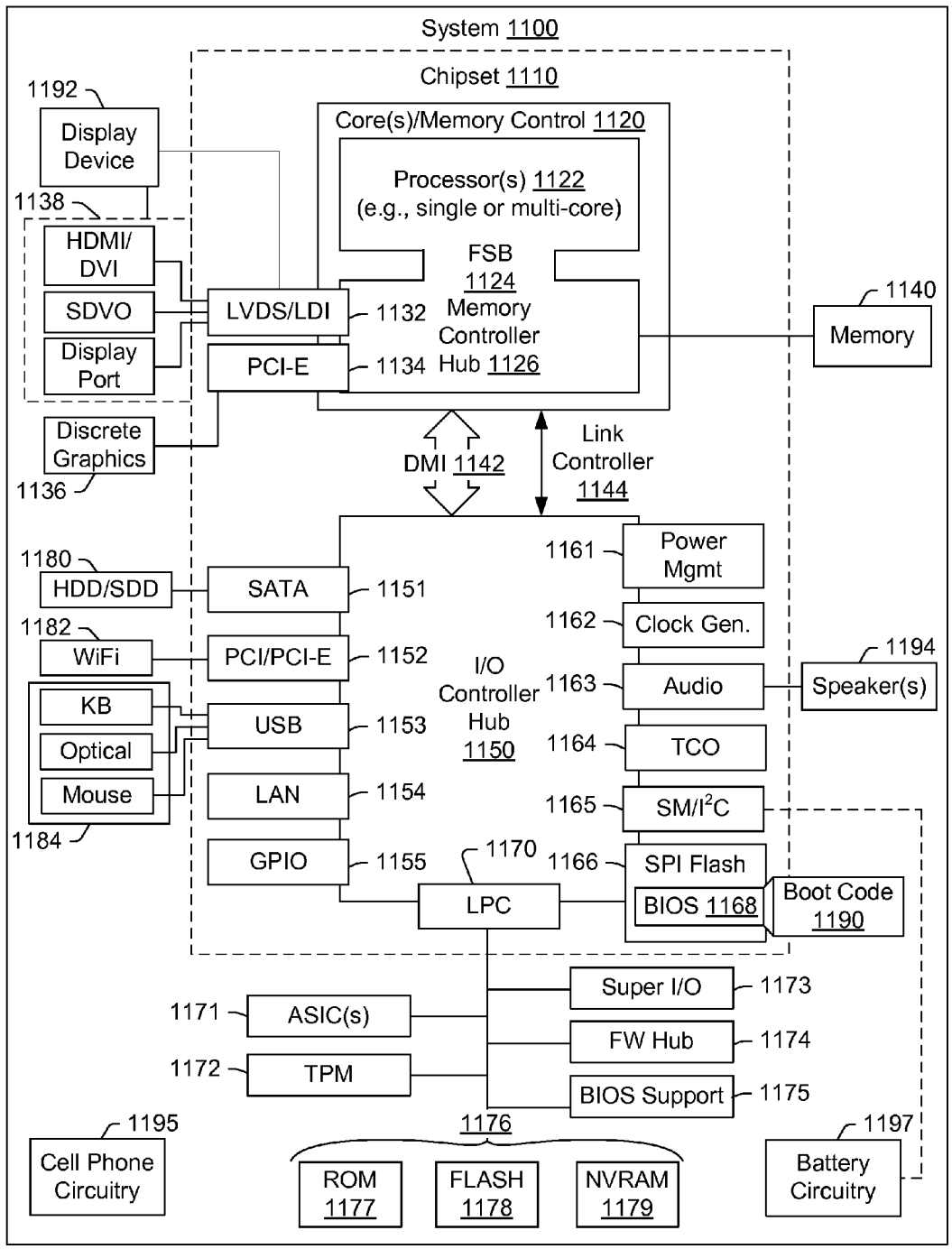
FIG. 11 is a diagram of an example of a system that includes one or more processors.

While various examples of circuits or circuitry have been discussed, FIG. 11 depicts a block diagram of an illustrative computer system 1100. The system 1100 may be a desktop computer system, such as one of the THINKCENTRE® or THINKPAD® series of personal computers sold by Lenovo (US) Inc. of Morrisville, N.C., or a workstation computer, such as the THINKSTATION®, which are sold by Lenovo (US) Inc. of Morrisville, N.C.; however, as apparent from the description herein, a satellite, a base, a server or other machine may include other features or only some of the features of the system 1100. As described herein, a device such as one of the devices 300 of FIG. 3 may include at least some of the features of the system 1100.

As shown in FIG. 11, the system 1100 includes a so-called chipset 1110. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a "northbridge" and a "southbridge").

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional "northbridge" style architecture.

The memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as "system memory".

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). A block 1138 includes some examples of technologies that may be supported via the LVDS interface 1132 (e.g., serial digital video, HDMI/DVI, display port). The memory controller hub 1126 also includes one or more PCI-express interfaces (PCI-E) 1134, for example, for support of discrete graphics 1136. Discrete graphics using a PCI-E interface has become an alternative approach to an accelerated graphics port (AGP). For example, the memory controller hub 1126 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1150 includes a variety of interfaces. The example of FIG. 11 includes a SATA interface 1151, one or more PCI-E interfaces 1152 (optionally one or more legacy PCI interfaces), one or more USB interfaces 1153, a LAN interface 1154 (more generally a network interface), a general purpose I/O interface (GPIO) 1155, a low-pin count (LPC) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O hub controller 1150 may include integrated gigabit Ethernet controller lines multiplexed with a PCI-E interface port. Other network features may operate independent of a PCI-E interface.

The interfaces of the I/O hub controller 1150 provide for communication with various devices, networks, etc. For example, the SATA interface 1151 provides for reading, writing or reading and writing information on one or more drives 1180 such as HDDs, SDDs or a combination thereof. The I/O hub controller 1150 may also include an advanced host controller interface (AHCI) to support one or more drives 1180. The PCI-E interface 1152 allows for wireless connections 1182 to devices, networks, etc. The USB interface 1153 provides for input devices 1184 such as keyboards (KB), one or more optical sensors, mice and various other devices (e.g., microphones, cameras, phones, storage, media players, etc.). On or more other types of sensors may optionally rely on the USB interface 1153 or another interface (e.g., I²C, etc.). As to microphones, the system 1100 of FIG. 11 may include hardware (e.g., audio card) appropriately configured for receipt of sound (e.g., user voice, ambient sound, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and non-volatile RAM (NVRAM) 1179. With respect to the TPM 1172, this module may be in the form of a chip that can be used to authenticate software and hardware devices. For example, a TPM may be capable of performing platform authentication and may be used to verify that a system seeking access is the expected system.

The system 1100, upon power on, may be configured to execute boot code 1190 for the BIOS 1168, as stored within the SPI Flash 1166, and thereafter processes data under the control of one or more operating systems and application software (e.g., stored in system memory 1140). An operating system may be stored in any of a variety of locations and accessed, for example, according to instructions of the BIOS 1168. Again, as described herein, a satellite, a base, a server or other machine may include fewer or more features than shown in the system 1100 of FIG. 11. Further, the system 1100 of FIG. 11 is shown as optionally include cell phone circuitry 1195, which may include GSM, CDMA, etc., types of circuitry configured for coordinated operation with one or more of the other features of the system 1100. Also shown in FIG. 11 is battery circuitry 1197, which may provide one or more battery, power, etc., associated features (e.g., optionally to instruct one or more other components of the system 1100). As mentioned, a SMBus may be operable via a LPC (see, e.g., the LPC interface 1170), via an I²C interface (see, e.g., the SM/I²C interface 1165), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
recharging a lithium-ion cell according to a recharge cycle that comprises a constant voltage phase that is triggered in part by comparing potential of a negative electrode with respect to a positive electrode of the lithium-ion cell to a recharge cycle voltage parameter;
and based at least in part on an increase in potential of the negative electrode with respect to a reference electrode, for a subsequent recharge cycle, adjusting the recharge cycle voltage parameter to diminish the potential of the negative electrode with respect to the positive electrode that triggers the constant voltage phase.

2. The method of claim 1 wherein the negative electrode comprises a carbon matrix.

3. The method of claim 1 further comprising powering a vehicle with the lithium-ion cell.

4. The method of claim 1 further comprising powering a computer with the lithium-ion cell.

5. The method of claim 1 further comprising powering cellular communication circuitry with the lithium-ion cell.

6. A system comprising:
circuitry powered by DC power;
a lithium-ion cell that supplies DC power; and
circuitry that adjusts a recharge cycle voltage parameter for a constant voltage phase of a recharge cycle based on information indicative of an increase in potential of a negative electrode of the lithium-ion cell with respect to a reference electrode to diminish potential of the negative electrode with respect to a positive electrode of the lithium-ion cell that triggers the constant voltage phase of a recharge cycle.

7. The system of claim 6 wherein the lithium-ion cell comprises the reference electrode and wherein the information indicative of an increase in potential of the negative electrode comprises a measured potential value of the negative electrode with respect to the reference electrode of the lithium-ion cell.

8. The system of claim 6 wherein the information indicative of an increase in potential of the negative electrode comprises a schedule stored in memory of the system, the schedule being based on measurements of potential values of a negative electrode with respect to a reference electrode of at least one other lithium-ion cell.

9. The system of claim 8 wherein the schedule comprises a schedule of potential values with respect to one or more schedule parameters.

10. The system of claim 9 wherein the one or more schedule parameters comprise at least one member selected from a group consisting of a number of recharge cycles, time, and temperature.

11. The system of claim 6 wherein the information indicative of an increase in potential of the negative electrode comprises a value derived from a model of the potential with respect to one or more model parameters.

12. The system of claim 11 wherein the one or more model parameters comprise at least one member selected from a group consisting of a number of recharge cycles, time, and temperature.

13. The system of claim 6 wherein the circuitry powered by DC power comprises an electric motor.

14. The system of claim 6 wherein the circuitry powered by DC power comprises a computer.

15. The method of claim 6 wherein the circuitry powered by DC power comprises cellular communication circuitry.

16. A lithium-ion cell system comprising:
 a lithium-ion cell that comprises a carbon matrix anode, a cathode and a reference electrode;
 circuitry to measure potential of the carbon matrix anode with respect to the reference electrode; and
 circuitry to adjust a recharge cycle voltage parameter for a constant voltage phase of a recharge cycle for the lithium-ion cell based at least in part on an increase in the measured potential of the carbon matrix anode with respect to the reference electrode to diminish potential of the carbon matrix anode with respect to the cathode of the lithium-ion cell that triggers the constant voltage phase of a recharge cycle.

17. The lithium-ion cell system of claim 16 further comprising a bus interface for receipt of information for the circuitry to adjust the recharge cycle voltage parameter.

18. The lithium-ion cell system of claim 17 wherein the circuitry to adjust the recharge cycle voltage parameter adjusts the recharge cycle voltage parameter based on information received via the bus interface.

19. The lithium-ion cell system of claim 18 wherein the bus interface comprises a bus interface coupled to a member selected from selected from a group consisting of a computer bus or a vehicle bus.

* * * * *